(12) United States Patent
Xiao et al.

(10) Patent No.: US 11,890,698 B1
(45) Date of Patent: Feb. 6, 2024

(54) DOUBLE-BEAM LASER POLISHING DEVICE AND POLISHING METHOD FOR ALUMINUM ALLOY

(71) Applicant: SHENZHEN INSTITUTE OF INFORMATION TECHNOLOGY, Guangdong (CN)

(72) Inventors: Haibing Xiao, Guangdong (CN);
Yunsheng Zhang, Guangdong (CN);
Mingjun Liu, Guangdong (CN);
Yongquan Zhou, Guangdong (CN);
Xinzhong Wang, Guangdong (CN)

(73) Assignee: SHENZHEN INSTITUTE OF INFORMATION TECHNOLOGY, Guangdong (CN)

( * ) Notice: Subject to any disclaimer, the term of this patent is extended or adjusted under 35 U.S.C. 154(b) by 0 days.

(21) Appl. No.: 18/262,366

(22) PCT Filed: Aug. 26, 2021

(86) PCT No.: PCT/CN2021/114734
§ 371 (c)(1),
(2) Date: Jul. 20, 2023

(87) PCT Pub. No.: WO2022/241967
PCT Pub. Date: Nov. 24, 2022

(30) Foreign Application Priority Data

May 18, 2021 (CN) .......................... 202110539588.8

(51) Int. Cl.
*B23K 26/352* (2014.01)
*B23K 26/082* (2014.01)
(Continued)

(52) U.S. Cl.
CPC ........ *B23K 26/3576* (2018.08); *B23K 26/064* (2015.10); *B23K 26/0673* (2013.01);
(Continued)

(58) Field of Classification Search
CPC .............. B23K 26/3576; B23K 26/082; B23K 2103/10; B32K 26/0673
See application file for complete search history.

(56) References Cited

U.S. PATENT DOCUMENTS

2016/0059349 A1\* 3/2016 Sercel .................. B23K 26/402
65/32.1
2020/0171603 A1\* 6/2020 Yang .................... B23K 26/244

FOREIGN PATENT DOCUMENTS

CN 107225328 A 10/2017
CN 108817674 A 11/2018
(Continued)

*Primary Examiner* — Geoffrey S Evans
(74) *Attorney, Agent, or Firm* — Brooks Kushman P. C.; John E. Nemazi

(57) ABSTRACT

The present application provides a double-beam laser polishing device and a double-beam laser polishing method for an aluminum alloy, which includes a frame; a rotary workbench and an optical path system, which are arranged on the frame. The optical path system includes: a first fiber laser, a second fiber laser, a first three-dimensional galvanometer, and a second three-dimensional galvanometer. The first three-dimensional galvanometer is connected with the first fiber laser through an optical fiber, and the second three-dimensional galvanometer is connected with the second fiber laser through an optical fiber. The first three-dimensional galvanometer and the second three-dimensional galvanometer are arranged side by side above the rotary workbench in a horizontal direction.

10 Claims, 5 Drawing Sheets

(51) Int. Cl.
*B23K 26/064* (2014.01)
*B23K 26/12* (2014.01)
*B23K 26/073* (2006.01)
*B23K 26/067* (2006.01)
*B23K 103/10* (2006.01)

(52) U.S. Cl.
CPC .......... *B23K 26/073* (2013.01); *B23K 26/082* (2015.10); *B23K 26/12* (2013.01); *B23K 2103/10* (2018.08)

(56) References Cited

FOREIGN PATENT DOCUMENTS

| | | | |
|---|---|---|---|
| CN | 109676257 | A | 4/2019 |
| CN | 110899961 | A | 3/2020 |
| CN | 111266740 | A | 6/2020 |
| CN | 112756791 | A | 5/2021 |
| CN | 113290319 | A | 8/2021 |
| JP | 2008280562 | A | 11/2008 |
| WO | 2017143789 | A1 | 8/2017 |

* cited by examiner

DOUBLE-BEAM LASER POLISHING DEVICE AND POLISHING METHOD FOR ALUMINUM ALLOY

CROSS-REFERENCE TO RELATED APPLICATIONS

This application is the U.S. national phase of International Application No. PCT/CN2021/114734 with an international filing date of Aug. 26, 2021, designating the U.S., now pending, and claims the priority of the Chinese patent application with the application number 202110539588.8 and titled "DOUBLE-BEAM LASER POLISHING DEVICE AND POLISHING METHOD FOR ALUMINUM ALLOY" filed at the China Patent Office on May 18, 2021. The entire contents of which are incorporated by reference in this application.

TECHNICAL FIELD

The present application relates to the technical field of surface treatment, in particular to a double-beam laser polishing device and a double-beam laser polishing method for an aluminum alloy.

BACKGROUND

The statements herein only provide background information related to the present application and do not necessarily constitute prior art.

Aluminum alloy is an alloy material based on metallic aluminum and added with a certain amount of other alloying elements, and belongs to a kind of light metal material. Because of light weight and high strength, aluminum alloy has a strength close to that of high alloy steel, and is widely used as a structural material in aerospace, aviation, transportation, construction, motor, light industry, and daily necessities.

However, after aluminum alloy and other aluminum products are processed and left for a period of time, the surface of aluminum products will be oxidized when coming into contact with oxygen, forming a black dense oxide film, which will lead to the low surface finish of aluminum products and affect the use experience and beauty of aluminum products.

SUMMARY

It is one objective of embodiments of the present application to provide a double-beam laser polishing device, aiming at solving problems of how to modify a surface of an aluminum alloy or aluminum product when the surface of aluminum alloy or aluminum product is polished, so as to keep the surface smoothness of the aluminum product, avoid forming oxide film, and improve the use experience of the aluminum product.

In order to solve above technical problems, embodiments of the present application provides the following technical schemes.

According to a first aspect of the present application, there is provided a double-beam laser polishing device for an aluminum alloy, including: a frame; and a rotary workbench and an optical path system, which are arranged on the frame. The rotary workbench is configured for supporting a workpiece.

The optical path system comprises: a first fiber laser, a second fiber laser, a first three-dimensional galvanometer, and a second three-dimensional galvanometer. The first three-dimensional galvanometer is connected with the first fiber laser through an optical fiber, and the second three-dimensional galvanometer is connected with the second fiber laser through an optical fiber. The first three-dimensional galvanometer and the second three-dimensional galvanometer are arranged side by side above the rotary workbench in a horizontal direction. The first fiber laser and the second fiber laser are configured to emit laser beams with different powers and have different laser scanning paths.

In an embodiment, a first diffractive optical element tuner is arranged in the first three-dimensional galvanometer. A second diffractive optical element tuner is arranged in the second three-dimensional galvanometer. A light spot diameter of a laser beam after being converted by the first diffractive optical element tuner is larger than that of a laser beam after being converted by the second diffractive optical element tuner.

In an embodiment, the laser polishing device further comprises a gas path system arranged on the frame, and the gas path system comprises a gas storage tank and an inert gas sealed cabin. The gas storage tank is communicated with the inert gas sealed cabin through a gas delivery pipe, and the inert gas sealed cabin is arranged on the rotary workbench. The gas path system is configured to provide an inert gas for the surface of the workpiece.

In an embodiment, the laser polishing device further comprises a focal length adjusting mechanism arranged on the frame. The first three-dimensional galvanometer and the second three-dimensional galvanometer are arranged on the focal length adjusting mechanism. The focal length adjusting mechanism is configured to drive the first three-dimensional galvanometer and the second three-dimensional galvanometer to approach or leave the rotary workbench so as to adjust focal lengths of the laser beams focused on the workpiece.

In an embodiment, the focal length adjusting mechanism comprises: an upright post, and a driving piece arranged on the upright post. The upright post is fixedly connected with the frame. The driving piece is movably arranged on the upright post and is configured to move along a height direction of the upright post.

In an embodiment, the laser polishing device further comprises a controller. The controller is arranged on the frame. The controller is in electrical signal connection with the first fiber laser, the second fiber laser, the first three-dimensional galvanometer, the second three-dimensional galvanometer, and the rotary workbench, respectively. The controller is configured for controlling a scanning path of the first three-dimensional galvanometer according to a received first polishing path and controlling a scanning path of the second three-dimensional galvanometer according to a received second polishing path.

In an embodiment, the laser polishing device further comprises a display. The display is arranged at one side of the frame and is respectively in electrical signal connection with the first fiber laser, the second fiber laser the first three-dimensional galvanometer, the second three-dimensional galvanometer, and rotary workbench.

In an embodiment, the rotary workbench is provided with an energy field generator, and the energy field generator is configured to load an energy field for the workpiece.

According to a second aspect of the present application, a double-beam laser polishing method for aluminum alloy is provided. The method is applied to the laser polishing device for the aluminum alloy in any one of embodiments of the first aspect of the present application. The double-beam laser polishing method for aluminum alloy includes following steps:

mounting a workpiece on the rotary workbench;

obtaining, by the controller, a machining scanning trajectory, and planning a scanning path of the first three-dimensional galvanometer and a scanning path of the second three-dimensional galvanometer based on analog signals of an inclination sensor, a position sensor, and an electronic pressure regulating valve sent by the first three-dimensional galvanometer and the second three-dimensional galvanometer; and sending, by the controller, control signals to the first three-dimensional galvanometer and the second three-dimensional galvanometer to control the first three-dimensional galvanometer and the second three-dimensional galvanometer to emit laser beams and to scan and polish the workpiece according to the scanning path of the first three-dimensional galvanometer and the scanning path of the second three-dimensional galvanometer, respectively.

In an embodiment, the scanning path of the first three-dimensional galvanometer is different from the scanning path of the second three-dimensional galvanometer.

In an embodiment, a diameter of a light spot formed by the first three-dimensional galvanometer is larger than that of a light spot formed by the second three-dimensional galvanometer.

According to embodiments of the present application, the double-beam laser polishing device for an aluminum alloy has the following beneficial effects: the first fiber laser and the second fiber laser which can emit laser beams of different powers are arranged on the frame, the first fiber laser is connected with the first three-dimensional galvanometer through an optical fiber, and the second fiber laser is connected with the second three-dimensional galvanometer through an optical fiber, and scanning paths of the first three-dimensional galvanometer and the second three-dimensional galvanometer are set to be different. In this way, the laser beam emitted by the first fiber laser can roughly polish the surface of the aluminum alloy product through the first three-dimensional galvanometer, and the laser beam emitted by the second fiber laser can finely polish the surface of the aluminum alloy product through the second three-dimensional galvanometer, so that the "peak melting and valley filling" can be quickly realized, and the secondary roughness generated in the polishing by the first fiber laser can be reduced. Through the interaction between laser beams with different powers and the aluminum product material, a grain size and a fine structure of the surface of the aluminum product or aluminum alloy workpiece can be changed. Compared with the prior art, the present application can avoid the oxidation of the surface of the aluminum product to form the oxide film, and can effectively control the laser polishing cracks of the aluminum alloy; the surface smoothness and surface mechanical properties of the aluminum product or aluminum alloy product are improved.

BRIEF DESCRIPTION OF THE DRAWINGS

In order to explain the technical schemes of the embodiments of the present application more clearly, the drawings needed in the description of embodiments or exemplary technology will be briefly introduced below. Obviously, the drawings in the following description are only some embodiments of the present application. For those skilled in the art, other drawings may be obtained according to these drawings without paying creative labor.

DETAILED DESCRIPTION OF THE EMBODIMENTS

In order to make the purpose, technical schemes, and advantages of the present application clearer, the present application will be further described in detail with the attached drawings and embodiments. It should be understood that the specific embodiments described here are only used to explain the present application and are not used to limit the present application.

It should be noted that when a component is said to be "fixed" or "disposed" on another component, it can be directly or indirectly on another component. When a component is said to be "connected" to another component, it can be directly or indirectly connected to the other component. The azimuth or positional relationship indicated by the terms "upper", "lower", "left", and "right" is based on the azimuth or positional relationship shown in the attached drawings, and is only for the convenience of description, and does not indicate or imply that the referred device or element must have a specific orientation, be constructed and operated in a specific orientation, so it cannot be understood as a limitation of the present application. For those skilled in the art, the specific meanings of the above terms can be understood according to specific situations. The terms "first" and "second" are only used for convenience of description, and cannot be understood as indicating or implying relative importance or implicitly indicating the number of technical features. The meaning of "plural" is two or more, unless otherwise specifically defined.

Figure 1:
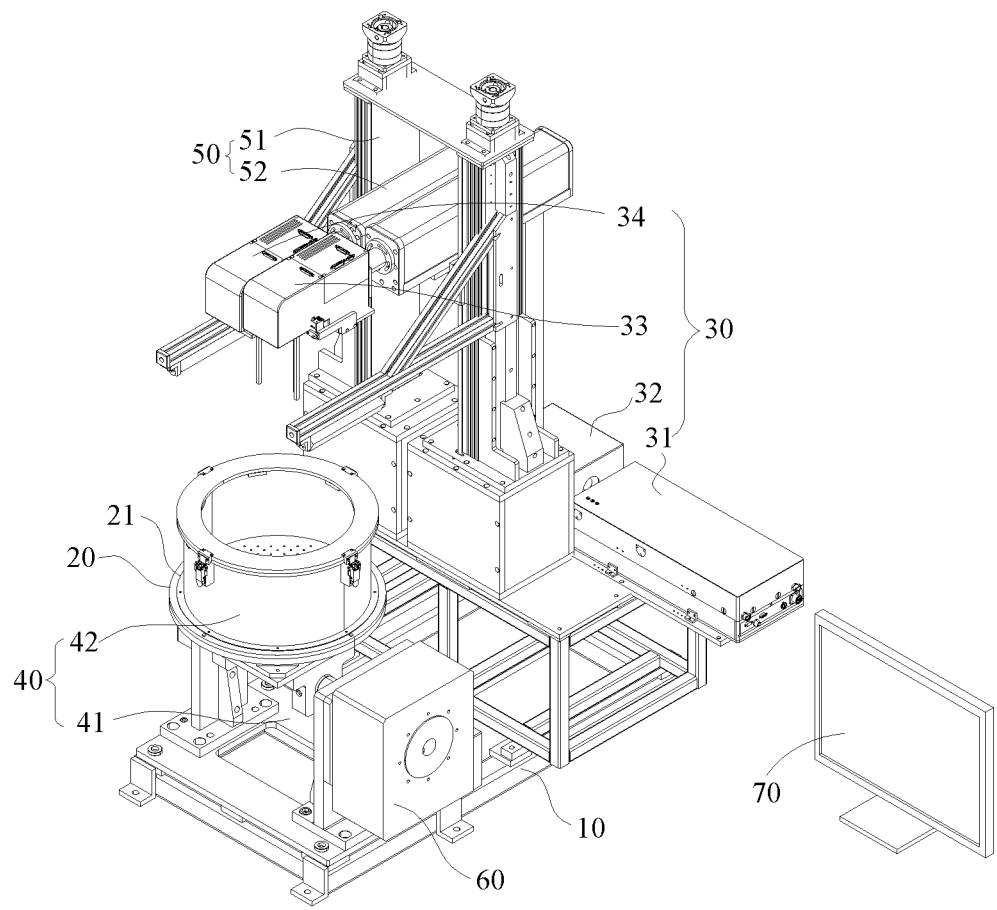
FIG. 1 is a schematic diagram of an overall structure of a double-beam laser polishing device for an aluminum alloy provided by an embodiment of a first aspect of the present application.
Figure 2:
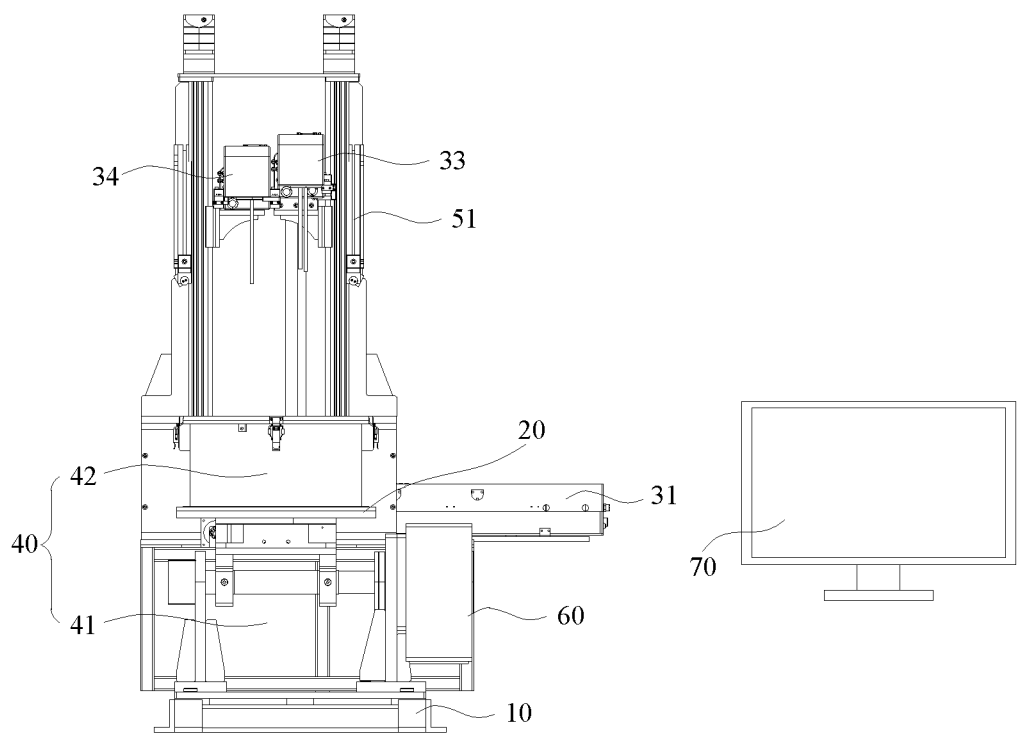
FIG. 2 is a front view of a double-beam laser polishing device for an aluminum alloy provided by an embodiment of the first aspect of the present application.
Figure 3:
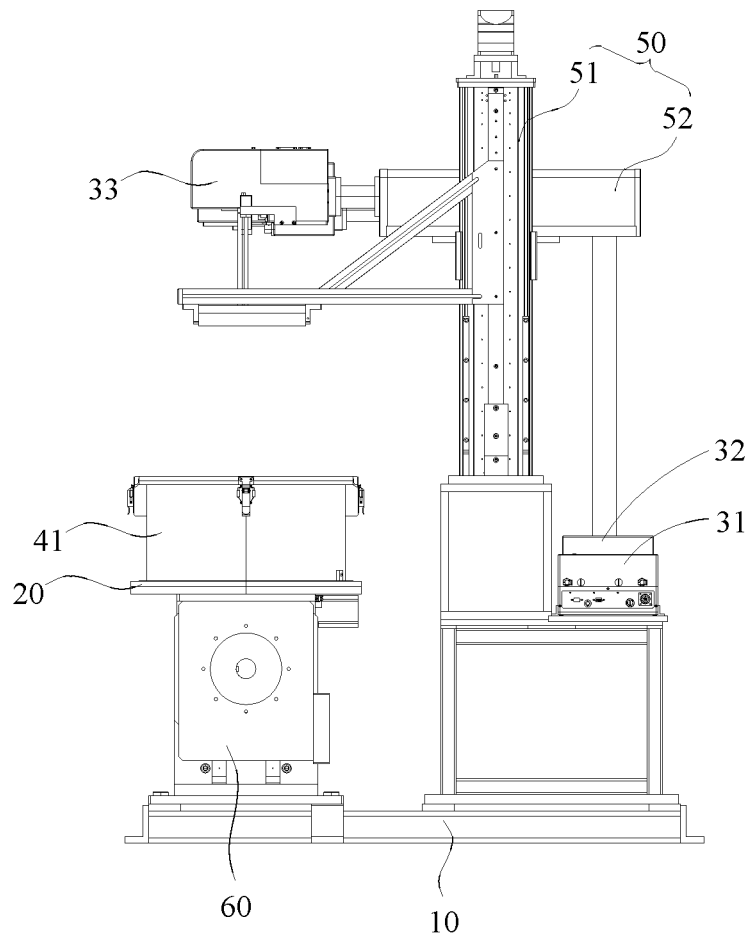
FIG. 3 is a right-side view of a double-beam laser polishing device for an aluminum alloy provided by an embodiment of the first aspect of the present application.

According to an embodiment of the first aspect of the present application, reference is made to FIGS. 1-3, in which, FIG. 1 is a schematic diagram of an overall structure of a double-beam laser polishing device for an aluminum alloy provided by an embodiment of a first aspect of the present application; FIG. 2 is a front view of a double-beam laser polishing device for an aluminum alloy provided by an embodiment of the first aspect of the present application; and FIG. 3 is a right-side view of a double-beam laser polishing device for an aluminum alloy provided by an embodiment of the first aspect of the present application. A double-beam laser polishing device for an aluminum alloy is provided in this embodiment, including a frame 10, and a rotary workbench 20 and an optical path system 30, both of which are arranged on the frame 10. The rotary workbench 20 is configured for supporting a workpiece.

Optionally, in an embodiment of the present application, the frame 10 may be made of an aluminum alloy, a stainless steel, or other alloy or metal materials.

The rotary workbench 20 may be made of the same material as the frame 10. In some possible embodiments, the material of the rotary workbench 20 may be different from that of the frame 10, for example, the rotary workbench 20 is made of granite, marble or ceramic materials.

It can be understood that in an embodiment of the present application, the rotary workbench 20 can be rotatably connected with the frame 10, for example, the rotary workbench 20 and the frame 10 can be rotatably connected through a rotating shaft and a bearing.

It is easy for those skilled in the art to know that in order to drive the rotary workbench 20 to rotate, in an embodiment of the present application, a driving device, such as a synchronous motor, a servo motor, or a stepping motor, can be arranged on the frame 10 to drive the rotary workbench.

It can be understood that a fixture, such as a three-gripper chuck or a four-gripper chuck, can be arranged on the rotary workbench 20 to clamp the workpiece. In some possible embodiments, the fixture can also be an electrically controlled permanent magnet chuck.

The optical path system 30 includes: a first fiber laser 31, a second fiber laser 32, a first three-dimensional galvanometer 33, and a second three-dimensional galvanometer 34. The first three-dimensional galvanometer 33 is connected with the first fiber laser 31 through an optical fiber, and the second three-dimensional galvanometer 34 is connected with the second fiber laser 32 through an optical fiber. The first three-dimensional galvanometer 33 and the second three-dimensional galvanometer 34 are arranged side by side above the rotary workbench 20 in a horizontal direction. The first fiber laser 31 and the second fiber laser 32 are configured to emit laser beams with different powers and have different laser scanning paths.

Optionally, in an embodiment of the present application, the first fiber laser 31 is a continuous fiber laser, which can generate a continuous laser beam with a power of between 300 W and 1000 W (watt), and the second fiber laser 32 is a pulse laser, which can generate a pulsed laser beam with a power of between 40 W and 60 W.

Among them, the first three-dimensional galvanometer 33 can convert a continuous laser beam generated by the first fiber laser 31 into a flat-top spot, so that the laser beam has a uniform energy distribution over the entire spot area of the flat-top spot, and a spot diameter is large. By controlling the energy density, irradiation time, and action area of the laser beam, a certain preheating effect can be achieved, so that a surface temperature of the aluminum alloy product or aluminum product is slightly lower than a melting point temperature, and the effects of preheating and rough polishing can be achieved.

Accordingly, the second three-dimensional galvanometer 34 can convert a pulsed laser beam provided by the second fiber laser 32 into a flat-top spot, the diameter of which is smaller than that of the light spot converted by the first three-dimensional galvanometer 33, so that a concentrated pulse peak energy can be obtained, and a relatively high laser energy can be obtained in a relatively small local area, which can quickly melt micro-surface peaks of an irregular curved surface, so that a molten material can quickly fill valleys, that is, "peak melting and valley filling", thereby reducing the surface roughness of the workpiece.

In addition, in an embodiment of the present application, the scanning paths of the first three-dimensional galvanometer 33 and the second three-dimensional galvanometer 34 are set to be different, so that the pulsed laser beam can more effectively reduce the secondary roughness generated by the continuous laser beam, and the surface of the aluminum product workpiece is modified through the interaction between the laser beams with different powers and the surface of the workpiece, so that a passivation layer can be formed on the surface of the aluminum product, and an oxide film can be prevented from being formed on the surface of the aluminum product, in this way, the surface smoothness of the aluminum product or aluminum alloy product is effectively improved, and the user experience is improved.

In embodiments of the present application, the first fiber laser 31 and the second fiber laser 32 which can emit laser beams of different powers are arranged on the frame 10, the first fiber laser 31 is connected with the first three-dimensional galvanometer 33 through an optical fiber, and the second fiber laser 32 is connected with the second three-dimensional galvanometer 34 through an optical fiber, and scanning paths of the first three-dimensional galvanometer 33 and the second three-dimensional galvanometer 34 are set to be different. In this way, the laser beam emitted by the first fiber laser 31 can roughly polish the surface of the aluminum alloy product through the first three-dimensional galvanometer 33, and the laser beam emitted by the second fiber laser 32 can finely polish the surface of the aluminum alloy product through the second three-dimensional galvanometer 34, so that the "peak melting and valley filling" can be quickly realized, and the secondary roughness generated in the polishing by the first fiber laser 31 can be reduced. Through the interaction between laser beams with different powers and the aluminum product material, a grain size and a fine structure of the surface of the aluminum product or aluminum alloy workpiece can be changed. Compared with the prior art, the present application can avoid the oxidation of the surface of the aluminum product to form the oxide film, and can effectively control the laser polishing cracks of the aluminum alloy; the surface smoothness and surface mechanical properties of the aluminum product or aluminum alloy product are improved.

Figure 4:
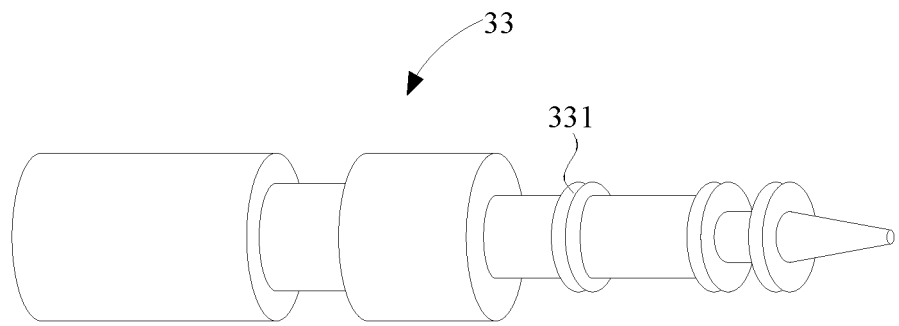
FIG. 4 is a schematic diagram of an internal structure of a first three-dimensional galvanometer.

Optionally, withe reference to FIG. 4, which is a schematic diagram of an internal structure of a first three-dimensional galvanometer, a first diffractive optical element tuner 331 is arranged in the first three-dimensional galvanometer 33, a second diffractive optical element tuner is arranged in the second three-dimensional galvanometer 34, and a light spot diameter of a laser beam after being converted by the first diffractive optical element tuner 331 is larger than that of a laser beam after being converted by the second diffractive optical element tuner.

It should be noted that the present application only takes the internal structure of the first three-dimensional galvanometer 33 as an example, and it can be understood that the internal structure of the second three-dimensional galvanometer 34 may be the same as that of the first three-dimensional galvanometer 33.

A diffractive optical element tuner (DOE) 331 can be installed in the first three-dimensional galvanometer 33 to convert a Gaussian laser beam, and a flat-top spot can be formed after a resulting converted Gaussian laser beam passing through a Z-axis movable lens and a focusing the lens. Similarly, a DOE converter may be provided in the second three-dimensional galvanometer 34 to convert a Gaussian laser beam. It can be understood that a diameter of the flat-top spot converted by the DOE converter in the second three-dimensional galvanometer 34 is smaller than that of the flat-top spot converted by the DOE converter in the first three-dimensional galvanometer 33.

In this way, a concentrated pulse peak energy can be obtained, and a relatively higher laser energy can be obtained in a relatively small local area, so that micro-surface peaks of an irregular curved surface can be quickly melted, and a melted material can be quickly filled into the valleys, that is, "peak melting and valley filling", so that the surface roughness of the workpiece can be reduced.

Optionally, with reference to FIG. 1 and FIG. 2, in an embodiment of the present application, the double-beam laser polishing device for an aluminum alloy further includes a gas path system 40 arranged on the frame 10, and the gas path system 40 includes a gas storage tank 41 and an inert gas sealed cabin 42. The gas storage tank 41 is communicated with the inert gas sealed cabin 42 through a gas delivery pipe, and the inert gas sealed cabin 42 is arranged on the rotary workbench 20. The gas path system 40 is configured to provide an inert gas for a surface of the workpiece.

Optionally, in an embodiment of the present application, the gas storage tank 41 can be a pressurized gas storage tank, and an inert gas, such as nitrogen, helium, xenon, or argon can be stored in the gas storage tank 41.

In practical use, the workpiece can be placed in the inert gas sealed cabin 42, and inert gas is introduced into the inert gas sealed cabin 42, so that the polishing process can be carried out in an inert gas atmosphere, which can effectively avoid the oxidation of the surface of the workpiece during the polishing process and effectively improve the surface smoothness of the aluminum alloy workpiece.

The gas storage tank 41 can be fixed on the frame 10 by bolts, screws, or screw rods, and similarly, the inert gas sealed cabin 42 can also be fixed on the rotary workbench 20 and rotate together with the rotary workbench 20.

Optionally, as shown in FIGS. 1 and 2, in an embodiment of the present application, the double-beam laser polishing device for an aluminum alloy further includes a focal length adjusting mechanism 50 arranged on the frame 10. The first three-dimensional galvanometer 33 and the second three-dimensional galvanometer 34 are arranged on the focal length adjusting mechanism 50. The focal length adjusting mechanism 50 can drive the first three-dimensional galvanometer 33 and the second three-dimensional galvanometer 34 to approach or leave the rotary workbench so as to adjust focal lengths of the laser beams focused on the workpiece.

Optionally, the focal length adjusting mechanism 50 includes: an upright post 51, and a driving piece 52 arranged on the upright post 51. The upright post 51 is fixedly connected with the frame 10. The driving piece 52 is movably arranged on the upright post 51 and is configured to move along a height direction of the upright post 51.

Among them, the upright post 51 can be fixed on the frame 10 by the aforementioned connecting parts such as screws, bolts, or screw rods. In some possible embodiments, the upright post 51 can also be welded to the frame 10 by welding.

The driving piece 52 can be a sliding cylinder, a linear cylinder, or a piston cylinder. The sliding cylinder can slide on the upright post and drive the first three-dimensional galvanometer 33 and the second three-dimensional galvanometer 34 arranged on a slider of the sliding cylinder to move together. It can be understood that the driving modes of the linear cylinder and the piston cylinder can be the same as or similar to that of the sliding cylinder, which will not be described in detail in embodiments of the present application.

By arranging the focal length adjusting mechanism 50 to drive the first three-dimensional galvanometer 33 and the second three-dimensional galvanometer 34 close to or away from the rotary workbench 20, an appropriate polishing focal length can be adjusted for workpieces with different sizes, and the present application range of the laser polishing device can be improved.

Optionally, as shown in FIG. 1 and FIG. 2, in an embodiment of the present application, the double-beam laser polishing device for an aluminum alloy further includes a controller 60. The controller 60 is arranged on the frame 10. The controller 60 is in electrical signal connection with the first fiber laser 31, the second fiber laser 32, the first three-dimensional galvanometer 33, the second three-dimensional galvanometer 34, and the rotary workbench 20, respectively. The controller 60 is configured for controlling a scanning path of the first three-dimensional galvanometer 33 according to a received first polishing path and controlling a scanning path of the second three-dimensional galvanometer 34 according to a received second polishing path.

Optionally, in an embodiment of the present application, the controller 60 may be a central processing unit (CPU), a microcontroller unit (MCU), a field-programmable gate array (FPGA), and the like.

It can be understood that, in some possible embodiments, the controller 60 can also be a computer host or a computer and other equipment equipped with the above CPU, MCU, or FPGA.

Optionally, as shown in FIG. 1, the laser polishing device further includes a display 70. The display 70 is arranged at one side of the frame 10 and is respectively in electrical signal connection with the first fiber laser 31, the second fiber laser 32, the first three-dimensional galvanometer 33, the second three-dimensional galvanometer 34, and rotary workbench 20.

The display can be a liquid crystal display, a liquid crystal display screen, or other display screens, and the display screen can be configured to display information such as polishing parameters or current control parameters of the laser polishing device, so that workers can better control and operate the laser polishing device.

Optionally, as shown in FIG. 1, in an embodiment of the present application, the rotary workbench 20 is provided with an energy field generator 21, and the energy field generator 21 is configured to load an energy field for the workpiece.

Optionally, in an embodiment of the present application, the energy field generator 21 may be an electromagnetic field generator, an ultrasonic generator, or a composite generator of an electromagnetic field generator and an ultrasonic generator.

Optionally, the electromagnetic field generator can emit an electromagnetic field, and the electromagnetic field acts on the molten metal, so that the molten metal can flow on the surface of the workpiece and the polishing efficiency of the workpiece can be accelerated. In addition, the ultrasonic generator can generate ultrasonic vibration on the surface of the workpiece, so that micro-explosion occurs in the molten liquid metal on the surface of the workpiece, and air and air gaps in the liquid metal are exhausted, which can make the metal more compact after cooling and solidification, and make the surface strength of the workpiece higher.

Figure 5:
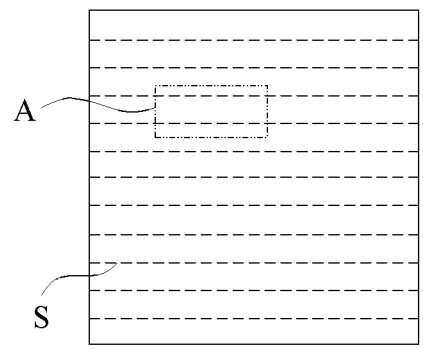
FIG. 5 is a scanning path diagram of a first three-dimensional galvanometer and a second three-dimensional galvanometer.
Figure 6:
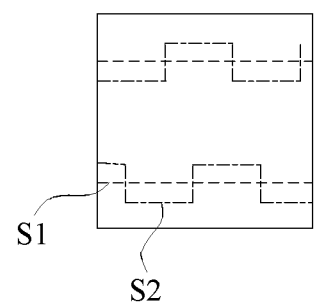
FIG. 6 is a partial enlarged view taken from Part A in FIG. 5.
Figure 7:
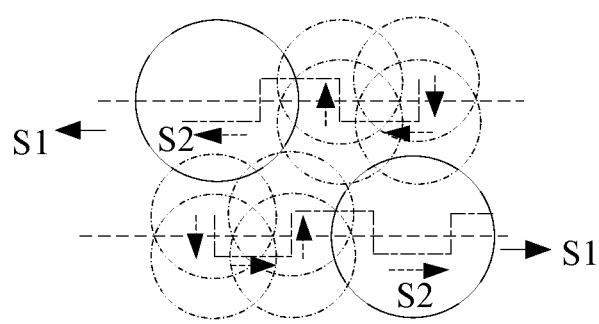
FIG. 7 is a detailed scanning path diagram of the first three-dimensional galvanometer and the second three-dimensional galvanometer.

In specific use, refer to FIGS. 5-7, in which, FIG. 5 is a scanning path diagram of a first three-dimensional galvanometer and a second three-dimensional galvanometer; FIG. 6 is a partial enlarged view taken from Part A in FIG. 5; and FIG. 7 is a detailed scanning path diagram of the first three-dimensional galvanometer and the second three-dimensional galvanometer. First, the workpiece can be mounted on the rotary workbench 20, and then the scanning path diagram of the first three-dimensional galvanometer 33 and the second three-dimensional galvanometer 34 shown in FIG. 7 can be acquired by the controller 60. For example, the scanning path of the first three-dimensional galvanometer 33 is set to a conventional zigzag or Z-shaped path S as shown in FIG. 5, and the pulsed laser beam (that is, the second three-dimensional galvanometer 34) can be used as a sub-mirror or a mirror polishing tool, and may have a diversified path, such as the conventional zigzag or Z-shaped path, or a square wave path, a spiral wave path, etc. In FIGS. 6 and 7, it is taken the scanning path of the first three-dimensional galvanometer 33 being a zigzag path or Z-shaped path S1 and the scanning path of the second three-dimensional galvanometer 34 being a square wave path S2 as an example for explanation, as can be seen from FIG. 7, after the zigzag or Z-shaped path is coupled with the square wave path, the pulsed laser spot can quickly melt and polish the workpiece surface with the help of the afterheat of continuous laser beam, which can effectively improve the polishing effect and efficiency. In addition, the pulsed laser beam can also polish the secondary roughness caused by continuous laser beam, which improves the polishing effect.

Figure 8:
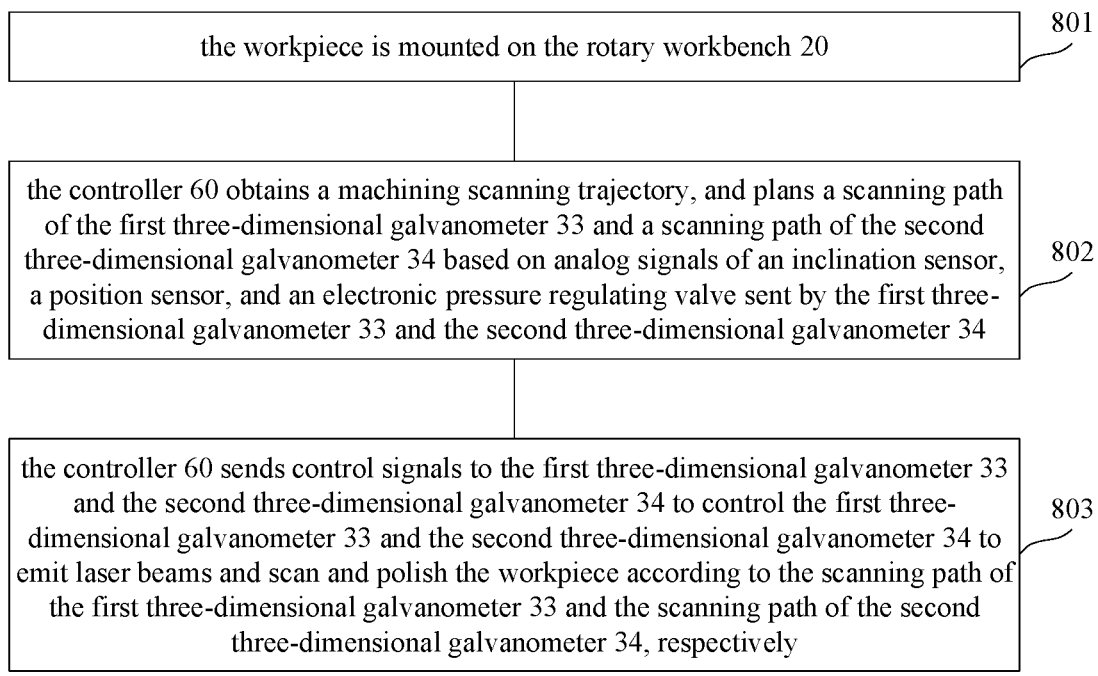
FIG. 8 is a flow chart of implementation of a double-beam laser polishing method for aluminum alloy provided by an embodiment of a second aspect of the present application.

According to the embodiment of the second aspect of the present application, reference is made to FIG. 8, which is a flow chart of implementation of a double-beam laser polishing method for aluminum alloy provided by an embodiment of a second aspect of the present application. An embodiment of the present application provides a double-beam laser polishing method for an aluminum alloy, which is used in the laser polishing device for an aluminum alloy provided by any alternative embodiment of the first aspect of the present application. The method is conducted by the following steps:

In step 801, the workpiece is mounted on the rotary workbench 20.

In step 802, the controller 60 obtains a machining scanning trajectory, and plans a scanning path of the first three-dimensional galvanometer 33 and a scanning path of the second three-dimensional galvanometer 34 based on analog signals of an inclination sensor, a position sensor, and an electronic pressure regulating valve sent by the first three-dimensional galvanometer 33 and the second three-dimensional galvanometer 34.

Optionally, in an embodiment of the present application, the controller 60 can communicate with the first three-dimensional galvanometer 33 and the second three-dimensional galvanometer 34 through a RS232 protocol.

In step 803, the controller 60 sends control signals to the first three-dimensional galvanometer 33 and the second three-dimensional galvanometer 34 to control the first three-dimensional galvanometer 33 and the second three-dimensional galvanometer 34 to emit laser beams and scan and polish the workpiece according to the scanning path of the first three-dimensional galvanometer 33 and the scanning path of the second three-dimensional galvanometer 34, respectively.

The scanning path of the first three-dimensional galvanometer 33 is different from the scanning path of the second three-dimensional galvanometer 34; and a diameter of the light spot formed by the first three-dimensional galvanometer 33 is larger than that of the light spot formed by the second three-dimensional galvanometer 34.

The above is only alternative embodiments of the present application, and is not used to limit the present application. Various modifications and variations will be made by those skilled in the art. Any modification, equivalent substitution, improvement, etc. made within the spirits and principles of the present application shall be included in the scope of the claims of the present application.

What is claimed is:

1. A double-beam laser polishing device for an aluminum alloy, comprising:
  a frame; and
  a rotary workbench and an optical path system, which are arranged on the frame;
  wherein
  the rotary workbench is configured for supporting a workpiece;
  the optical path system comprises: a first fiber laser, a second fiber laser, a first three-dimensional galvanometer, and a second three-dimensional galvanometer;
  the first three-dimensional galvanometer is connected with the first fiber laser through an optical fiber, and the second three-dimensional galvanometer is connected with the second fiber laser through an optical fiber;
  the first three-dimensional galvanometer and the second three-dimensional galvanometer are arranged side by side above the rotary workbench in a horizontal direction;
  the first fiber laser and the second fiber laser are configured to emit laser beams with different powers and have different laser scanning paths, so as to achieve peak melting and valley filling and reduce a secondary roughness generated during polishing by the first fiber laser; and
  a scanning path of the first three-dimensional galvanometer is a zigzag path, and a scanning path of the second three-dimensional galvanometer is a Z-shaped path, a square wave path, or a spiral wave path; or alternatively, the scanning path of the first three-dimensional galvanometer is a Z-shaped path, and the scanning path of the second three-dimensional galvanometer is a zigzag path, a square wave path, or a spiral wave path.

2. The double-beam laser polishing device for the aluminum alloy according to claim 1, wherein
  a first diffractive optical element tuner is arranged in the first three-dimensional galvanometer;
  a second diffractive optical element tuner is arranged in the second three-dimensional galvanometer; and
  a light spot diameter of a laser beam after being converted by the first diffractive optical element tuner is larger than that of a laser beam after being converted by the second diffractive optical element tuner.

3. The double-beam laser polishing device for the aluminum alloy according to claim 1, wherein
  the laser polishing device further comprises a gas path system arranged on the frame, and the gas path system comprises a gas storage tank and an inert gas sealed cabin;
  the gas storage tank is communicated with the inert gas sealed cabin through a gas delivery pipe, and the inert gas sealed cabin is arranged on the rotary workbench; and
  the gas path system is configured to provide an inert gas for the surface of the workpiece.

4. The double-beam laser polishing device for the aluminum alloy according to claim 1, wherein the laser polishing device further comprises a focal length adjusting mechanism arranged on the frame;

the first three-dimensional galvanometer and the second three-dimensional galvanometer are arranged on the focal length adjusting mechanism; and the focal length adjusting mechanism is configured to drive the first three-dimensional galvanometer and the second three-dimensional galvanometer to approach or leave the rotary workbench so as to adjust focal lengths of the laser beams focused on the workpiece.

5. The double-beam laser polishing device for the aluminum alloy according to claim 4, wherein the focal length adjusting mechanism comprises: an upright post, and a driving piece arranged on the upright post;

the upright post is fixedly connected with the frame; and the driving piece is movably arranged on the upright post and is configured to move along a height direction of the upright post.

6. The double-beam laser polishing device for the aluminum alloy according to claim 1, wherein the laser polishing device further comprises a controller;

the controller is arranged on the frame;

the controller is in electrical signal connection with the first fiber laser, the second fiber laser, the first three-dimensional galvanometer, the second three-dimensional galvanometer, and the rotary workbench respectively; and the controller is configured for controlling a scanning path of the first three-dimensional galvanometer according to a received first polishing path and controlling a scanning path of the second three-dimensional galvanometer according to a received second polishing path.

7. The double-beam laser polishing device for the aluminum alloy according to claim 6, wherein the laser polishing device further comprises a display; and the display is arranged at one side of the frame and is respectively in electrical signal connection with the first fiber laser, the second fiber laser the first three-dimensional galvanometer, the second three-dimensional galvanometer, and rotary workbench.

8. The double-beam laser polishing device for the aluminum alloy according to claim 1, wherein the rotary workbench is provided with an energy field generator, and the energy field generator is configured to load an energy field for the workpiece.

9. A double-beam laser polishing method for an aluminum alloy, being applied to the laser polishing device for the aluminum alloy according to claim 1, the method comprising:

mounting a workpiece on the rotary workbench;

obtaining, by the controller, a machining scanning trajectory, and planning a scanning path of the first three-dimensional galvanometer and a scanning path of the second three-dimensional galvanometer based on analog signals of an inclination sensor, a position sensor, and an electronic pressure regulating valve sent by the first three-dimensional galvanometer and the second three-dimensional galvanometer; and sending, by the controller, control signals to the first three-dimensional galvanometer and the second three-dimensional galvanometer to control the first three-dimensional galvanometer and the second three-dimensional galvanometer to emit laser beams and to scan and polish the workpiece according to the scanning path of the first three-dimensional galvanometer and the scanning path of the second three-dimensional galvanometer, respectively.

10. The double-beam laser polishing method for the aluminum alloy according to claim 9, wherein the scanning path of the first three-dimensional galvanometer is different from the scanning path of the second three-dimensional galvanometer; and a diameter of a light spot formed by the first three-dimensional galvanometer is larger than that of a light spot formed by the second three-dimensional galvanometer.

\* \* \* \* \*